Jan. 21, 1969    R. K. BOYER ET AL    3,422,837
FILLING VALVE STRUCTURE FOR PRESSURIZED CONTAINERS
Filed Dec. 27, 1966
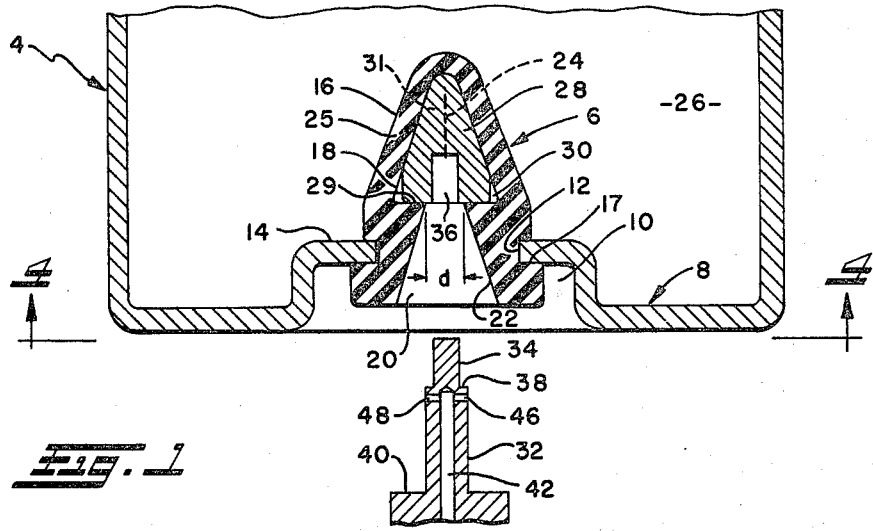
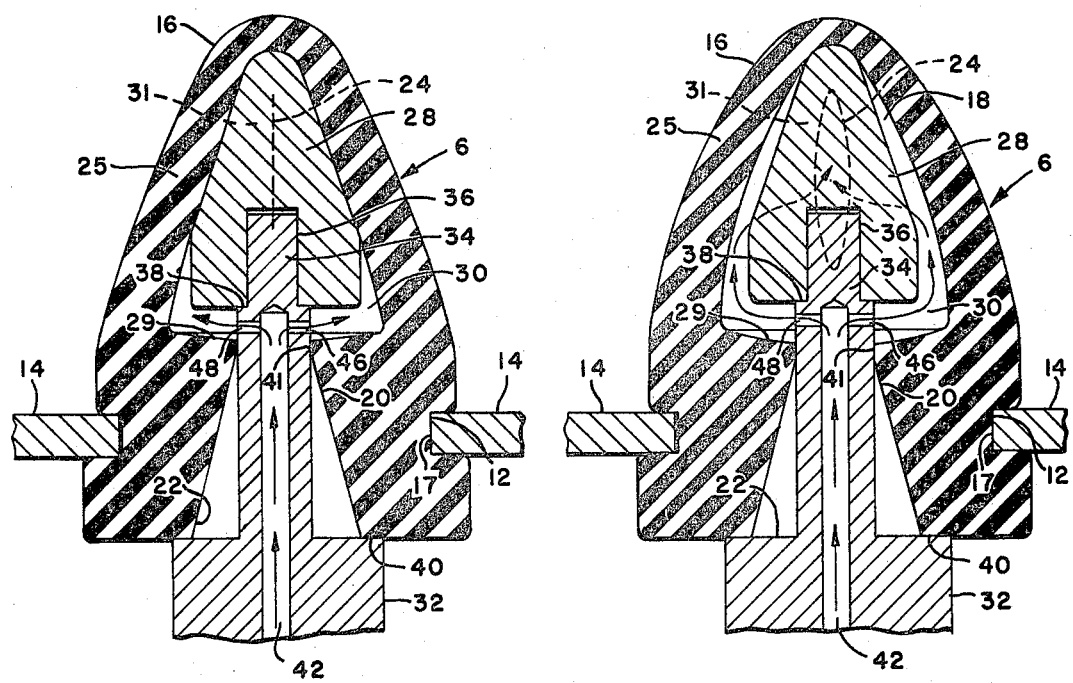
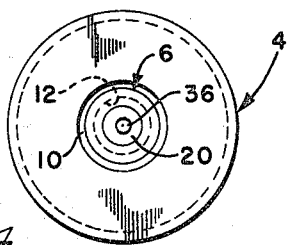
INVENTORS
RALPH K. BOYER
HOMER F. EYERDAM
HENRY W. KROHN
ATTORNEYS- Kramer & Sturges

United States Patent Office 3,422,837
Patented Jan. 21, 1969

3,422,837
FILLING VALVE STRUCTURE FOR PRESSURIZED CONTAINERS
Ralph K. Boyer, Cleveland, Homer F. Eyerdam, Lakewood, and Henry W. Krohn, North Olmstead, Ohio, assignors to Eaton Yale & Towne, Inc., Cleveland, Ohio, a corporation of Ohio
Filed Dec. 27, 1966, Ser. No. 604,701
U.S. Cl. 137—322     12 Claims
Int. Cl. F16k *15/20*

ABSTRACT OF THE DISCLOSURE

This invention provides a filling valve for pressurized fluid containers characterized by a resilient valve body provided with an internal chamber and a valve member contained within the chamber and accessible from the outside of the valve body. These valves are frictionally retained in an opening through the container wall.

---

This invention is particularly well suited for so called aerosol-type pressurized containers used, for example, to dispense liquids, such as disinfectants or insecticides in spray form, and semi-solid food products such as whipped cream or salad dressing.

Many of the valves presently used for dispensing material from such containers, are alternately used for filling the containers. However, such valves are usually very complicated and correspondingly costly. Other containers are filled with fluid prior to sealing the containers, e.g., at a temperature where the propellant is a liquid. This method becomes impractical when refilling the container. This invention is directed to providing a relatively simple and economic valve for allowing fluid under pressure to pass into the container after it has been sealed, either as the initial charge to the container or as a refill.

Briefly stated, the invention is in a one way filling valve for use in a conventional pressurized fluid container. In accordance herewith, there is provided a resilient or elastic body or housing having a closed first end and an open second end and an internal, expansible valve chamber or cavity. Said closed end is provided with a port communicating between the valve chamber and the interior of the container. An opening is provided in said second end of said housing and commnuicates between the valve chamber and exterior of the container. The port is preferably a self-sealing slit or puncture which becomes enlarged and open when the valve chamber is expanded under the influence of fluid under pressure as hereinafter described. A valve member independent of, and comparatively more rigid than the housing, is disposed entirely within the valve chamber in sealing relation with a valve seat surrounding said opening. In the preferred embodiment, the valve member coacts with the port to provide a seal inhibiting reverse flow of the pressurized contents out of the container. To this end, the valve member is preferably configured to substantially fill the valve chamber and is positioned relative to the port such that when it is moved out of sealing relation with the valve seat it remains generally in sealing relation with the outlet port. To actuate the valve, there are utilized means which are applied through the opening for engaging and moving the valve member out of sealing relation with the valve seat surrounding said opening. When the valve member is unseated, pressurized fluid is used to expand or balloon the resilient housing and move the port away from said valve member to unseal said port, whereby fluid under pressure can move through said port and into the interior of said container.

The following description of the invention will be better understood by having reference to the next drawing wherein:

FIGURE 1 is a fragmentary sectional view of an aerosol-type container, showing in cross section an embodiment of the filling valve in seated and sealed relation;

FIGURE 2 is an enlarged sectional view of the filling valve in partially unseated relation;

FIGURE 3 is a similar enlarged sectional view of the filling valve in unseated relation, the arrows illustrating how fluid under pressure flows through the valve into the container; and FIGURE 4 is a reduced plan view of the container as seen from the plane indicated by the line 4—4 of FIGURE 1.

Environment of invention

Referring more particularly to the drawing, there is shown a bottom portion of a pressurized container, generally indicated at 4. The container 4 is provided with a one way filling valve 6 which is perferably mounted in the container bottom 8.

The valve is mouted within a circular recess 10 provided in the container bottom 8, in order to prevent the valve 6 from interfering with the stability of the container 4 and to allow for nesting of can bottoms before assembly into a complete can body. The recess 10 has a centrally disposed opening 12 with a surrounding annular flange 14.

The invention

The valve 6 comprises a body or housing 16 which is adapted to be mounted in the opening 12 in interlocked relation with the annular flange 14, e.g. the flange 14 is sealingly received in a mating annular recess 17 disposed in the outer peripherial surface of the housing 16. The housing 16 is preferably made of elastic or resilient material, e.g. nitrile rubber.

The resilient housing 16 is provided with an internal expansible valve chamber 18 and an opening 20 leading from the exterior of the valve housing 16 and container 4 to the valve chamber 18. The opening 20 preferably has tapered sides 22 diverging from the valve chamber 18. The housing 16 is generally conical or bullet-shaped to facilitate insertion into the opening in the metallic container bottom, and is symmetrically formed about a longitudinal axis which coincides with the longitudinal axis of the valve chamber 18 and opening 20.

A port 24 is disposed near one end of the resilient housing 16 and communicates between the valve chamber 18 and interior 26 of the container 4. The port 24 is preferably a self-sealing slit or puncture disposed in the resilient housing walls 25, the slit 24 becoming enlarged and open when the valve chamber 18 is expanded on filling. The outlet port is formed in such a way that no material is removed from the side wall of the chamber.

A valve member 28, independent of the valve body or housing 16, is disposed and retained by the resilient walls 25 wholly within the valve chamber 18. The valve member 28 is comparatively more rigid than the valve housing 16 and can be composed of any suitable material, e.g. a rigid plastic body such as nylon or poly (tetrafluoroethylene) plastic or metal such as brass. The valve member 28 is preferably configured to substantially fill the valve chamber 18 and includes a generally conical tip or first end and a generally planar second end. Said conical tip engages a complementary surface defined in the interior of said housing and said planar end engages valve seat 29. An annular space 30 formed between the valve member 28 and housing adjacent the opening 20 can be provided to facilitate insertion of the valve member 28 and permit passage of fluid around said valve member as will be more fully described hereafter.

The valve member 28 is preferably slightly larger than the valve chamber 18, i.e. preferably longer measured axially, and is, therefore, normally biased by the resilient housing 16 in sealing and seated relation with the valve seat 29 surrounding the opening 20. In the preferred embodiment valve seat 29 is an annular shoulder defined in said valve body or housing 16. As shown in FIGURE 2 valve seat 29 is slightly tapered to establish firm sealing between said seat and valve member 28.

*Operation of the valve 6*

An external, hollow needle or filling probe 32 extending through opening 20, is used to actuate the valve 6 by unseating the valve member 28 from seat 29 and permit filling the container 4 with fluid under pressure.

The needle 32 is provided with a circular tip portion 34 which is received in a suitable cylindrical recess 36 extending into the valve body 28. The purpose of recess 36 is to give stability to the valve member 28 during filling and prevent cocking of the valve member 28 in the chamber 18 as the filling probe engages the valve member. An annular abutment or shoulder 38 is provided on the needle 32 for engaging the valve body 28 adjacent the cylindrical recess 36 when the tip portion 34 is inserted in the valve body recess 36. The needle 32 is also provided with an annular shoulder 40, for engaging the outermost portion of valve housing 16 adjacent the opening 20, and acts as a stop to keep the needle 32 from being plunged further into the valve chamber 18. Such engagement between the stop 40 and valve housing 16 also provides a temporary seal for said opening 20 during filling. The opening 20 preferably has a diameter (d) slightly smaller than the corresponding diameter of the needle 32 when it is fully inserted into the valve chamber 18. Thus, when the needle 32 is inserted, the valve housing portion 41 adjacent the valve seat 29, compressively engages the needle 32 to effect an additional temporary seal of the chamber opening 20 during filling.

The needle 32 has an axial passageway 42 for carrying fluid under pressure from a source of supply (not shown since this is not a part of the invention and any conventional means for supplying fluid under pressure can be used) through the opening 20 and valve chamber 18. A plurality of apertures, e.g. openings 46 and 48, communicating with, and radiating from the axial fluid passageway 42, are provided in the needle 32 adjacent the tip portion 34, for allowing fluid to flow through the opening 20 and into the space created by removal of the valve body 28 from seat 29 and resilient distension of housing 16.

FIGURE 2 better illustrates the needle or probe 32 holding the valve member 28 unseated and away from the valve seat 29. Fluid under pressure passes from the axial passageway 42 of the stem through the apertures 46 and 48 and into the valve chamber 18.

The port 24, however, is still closed or sealed at this time either by the valve member 28, or because of the sealing characteristic of the self-sealing slit. Fluid pressure quickly builds up within the valve chamber 18 as more fluid is forced therein and causes the resilient housing walls 25 to elongate and balloon outwardly expanding the walls defining the valve chamber 18. The seating region 31 of the port 24 moves away from and out of seating relation with the valve member 28 as the valve chamber 18 expands. In the preferred embodiment the expansion of the walls defining the valve chamber 18 not only moves the seating region 31 relative to the valve member 28, but also causes the slit or port 24 to enlarge and open, whereby fluid under pressure passes from the valve chamber 18 into the interior 26 of the container 4.

Fluid is passed through the valve 6 until the interior 26 is filled. The filling needle or probe 32 is then withdrawn from the opening 20. Fluid under pressure within the container 4 coacts with the resiliency of the valve housing 16 to move the valve housing 16 back toward its original shape, thereby returning the valve chamber 18 back to its original position or configuration and enduring only such extension as is imposed by the valve body 28. Thus, the walls 25 containing the self-sealing slit 24 are returned to their predetermined position relative to the housing 16 where the slit or port 24 becomes resealed. The resilient housing 16 also acts to bias the valve member 28 back into seated and sealing relation with the valve seat 29 surrounding the opening 20.

The preferred embodiment, just described, utilizes a self-sealing slit or port 24. Such a port is normally closed and may be opened by means of fluid pressure within said chamber. Within the scope of this invention should also be considered a normally open port or one which is defined by removal of material from the resilient wall 25. Sealing of a normally open port may be accomplished by direct engagement of the valve member 28 and the seating region surrounding said normally open port. Said normally open port may be disposed in said resilient wall such that unseating of the valve member from seat 29 and subsequent elongation of the valve body or housing by means of filling probe also causes said valve member to uncover said normally open port.

As was previously pointed out the external shape of the valve body or housing 16 is generally bullet-shaped to facilitate insertion of the valve into the container. Because the valve is retained in the container wall by means of engagement of flange 14 and the annular groove 12, application of excessive force to the valve will force said valve into the interior of the container. Thus if for any reason the valve should become inoperable, it can be readily replaced with another valve after pushing the inoperable valve into the container. This simplified replacement procedure greatly reduces the scrap hazard inherent in the manufacture and filling of pressurized containers.

Thus, there has been provided a novel valve employed in a container and useful in filling or refilling the container with fluid under pressure.

What is claimed is:
1. A valve mechanism comprising in combination:
 a hollow valve body closed at one end and open at the other end and defining a chamber therebetween, and including a port in said closed end,
 a valve member received within said chamber and having a first portion engaging said port in sealing relation and a second portion engaging a portion of said valve body adjacent said open end to close said open end from communication with said chamber,
 said valve member being movable in a direction away from said open end to a position to provide communication between said open end and the chamber and while in said position permitting expansion of said valve body to open said port in said closed end to provide communication between said open end and said port in said closed end.

2. The valve of claim 1 in which said port in said closed end is self-sealing and normally closed.

3. The valve of claim 2 in which said self-sealing port is further defined by a slit in said valve body.

4. The valve of claim 1 in which said valve member is bullet shaped having a generally conical first end and a generally planar second end, said conical first end engaging a complementary interior surface of said valve body and said planar second end engaging an annular shoulder adjacent said open end.

5. The valve of claim 4 in which a recess is defined in said panar end to receive a portion of a filling probe.

6. The valve of claim 4 in which said annular shoulder includes a tapered sealing surface.

7. The valve of claim 1 in which the axial length of said valve member exceeds the axial length of said chamber whereby said valve body is extended with said valve member disposed in said chamber causing said valve body to be biased in sealing relation against said portion of said valve body.

8. The valve of claim 1 in which said portion of said valve body adjacent said open end is further defined by an annular shoulder surrounding the opening in said open end.

9. The valve of claim 1 in which the opening in said open end is circular and has a diameter smaller than the diameter of the valve filling probe.

10. In combination:
 (a) a hollow container for holding fluid under pressure, and from which fluid is dispensed; and
 (b) means for placing fluid under pressures within said container including a valve comprising;
  (1) an elastic housing mounted on, and extending into the interior of said container, said housing having a resilient wall defining an expansible chamber, said resilient wall having a first closed end and a second open end,
  (2) a port in said first closed end providing communication between said chamber and the interior of said container,
  (3) a valve member received within said chamber and having a first portion engaging said port in sealing relation and a second portion engaging a portion of said housing adjacent said open end,
 (c) means for moving said valve member away from said open end to a position to provide communication between said open end and said chamber;
 (d) means to expand said chamber with said valve member in said position whereby said port becomes unsealed permiting fluid under pressure to pass through said port into said container.

11. A valve mechanism comprising in combination:
 a hollow valve body closed at one end and open at the other end and defining a chamber therebetween, and including a port in said closed end,
 a valve member received within said chamber and having a first portion engaging said port in sealing relation and a second portion engaging a portion of said valve body adjacent said open end to close said open end from communication with said chamber,
 said valve member being movable in a direction away from said open end to an unseating position with respect to said portion of said valve body to provide communication between said open end and said chamber and while in said position out of sealing engagement with said port to provide communication between said chamber and said port.

12. A valve mechanism comprising in combination:
 an elastic valve body closed at one end and open at the other end and defining a chamber therebetween,
 a self-sealing normally closed port in said closed end, the opening in said open end defined by a passageway in said valve body defined by a tapered wall diverging from said chamber,
 an annular valve seat in said chamber surrounding said passageway, said valve seat including a tapered sealing surface,
 a valve member received within said chamber and having a first portion engaging said port in sealing relation and a second portion engaging said valve seat, said valve member being bullet shaped including a generally conical first end and a generally planar second end, said conical first end engaging a complementary interior surface of said valve body and said planar second end engaging said valve seat,
 a recess defined in said planar end of said valve member to receive a portion of a filling probe,
 a sealing rim defined in said tapered wall, said rim having a diameter smaller than the diameter of a filling probe,
 said valve member being movable in a direction away from said valve seat to provide communication between said open end and said chamber and while unseated permitting expansion of said valve body to open said port in said closed end to provide direct communication between said open end and said port.

References Cited
UNITED STATES PATENTS

| | | | |
|---|---|---|---|
| 3,063,462 | 11/1962 | Potash | 137—223 |
| 3,100,498 | 8/1963 | Gibson | 137—223 |
| 3,375,957 | 4/1968 | Kuffer | 141—20 X |

WILLIAM S. BURDEN, *Primary Examiner.*

U.S. Cl. X.R.
173—223; 140—20